United States Patent Office 2,979,492
Patented Apr. 11, 1961

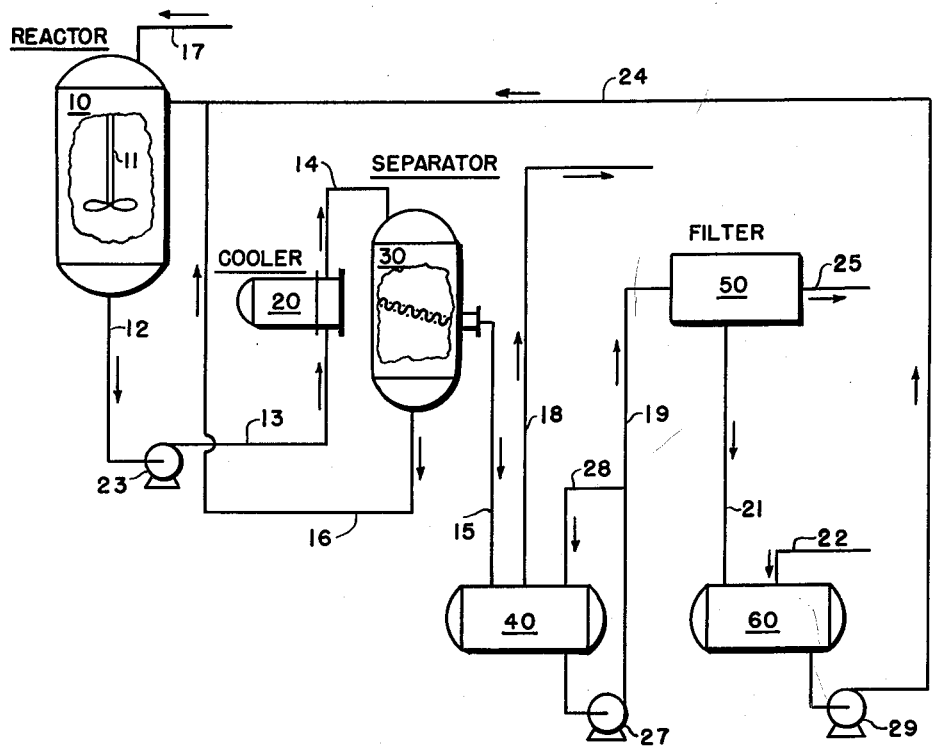

2,979,492

CONTINUOUS POLYMERIZATION PROCESS

Luke J. Governale and Thomas A. Leeper, Baton Rouge, La., assignors to Ethyl Corporation, New York, N.Y., a corporation of Delaware Filed June 3, 1957, Ser. No. 663,138

5 Claims. (Cl. 260—92.8)

This invention relates to the polymerization of vinyl chloride. More particularly, the invention relates to a new and improved suspension polymerization process for the manufacture and recovery of vinyl chloride, particularly susceptible of continuous operation.

Polyvinyl chloride is a highly desirable material for use in the molding and fabricating industry. One of four principal techniques is usually employed in its preparation by homopolymerization. The four principal methods include bulk polymerization, solution polymerization, emulsion polymerization and suspension polymerization. Suspension polymerization offers certain marked advantages, but heretofore has only been conducted on a batch basis which exhibits severe limitations.

The suspension polymerization technique involves the polymerization of the vinyl chloride monomer in the presence of a substantial amount of water, at moderately elevated temperatures and with a substantial degree of agitation. The polymerization is conducted in a closed reactor in the presence of a polymerization catalyst, and various additives for facilitating the process, such as wetting agents and extenders.

This process, though commercially used, has certain disadvantages. Batch operations are inherently less efficient, generally, because of periods in an operating cycle needed for charging, discharging, bringing a charge up to operating temperature, and cooling for discharging. The polymerization of vinyl chloride has exhibited a further drawback, in that the cyclic polymerization reaction itself goes through a wide variation in rate. During an initial portion of a cycle, the rate of polymerization is low and the quantity of heat evolved by the exothermic polymerization is low. The rate of polymerization, however, greatly increases during a cycle, and proportionately increases the heat evolution rate. As a consequence of this variable reaction rate, any given polymerization apparatus must be designed to accommodate such peak heat evolution loads, so that "run away" polymerizations will not be encountered. It should be noted at this point that temperature control is an important factor in predetermination of polymer quality and attributes. Higher temperatures tend to reduce the molecular weight of polymer product. Hence, where certain uniformly high molecular weight product is desired, the inability to attain high production without excessive temperature rise is a serious limitation.

Another disadvantage of present processes is that polymerizations cannot be conducted at temperatures below about 40° C. This is because of the slowness of the reaction. This very practical limitation exists even though improved properties of heat stability and greater linearity can be obtained at lower temperatures. The foregoing and other factors have appreciably limited the efficiency of suspension polymerization operations heretofore.

It is accordingly an object of this invention to provide a new and novel continuous polymerization process for suspension polymerization of vinyl chloride. A more specific object is to provide a polymerization process which achieves a more rapid polymerization rate without the disadvantages heretofore encountered. Another object of this invention is to provide a continuous process which achieves suspension polymerization of vinyl chloride monomers at high rates but nevertheless achieves product qualities heretofore available only with extended batch periods. Yet another object is to provide a process which permits production of polyvinyl chloride at low temperatures but, nevertheless at respectable production rates. A still further object of certain embodiments is to provide a combined polymerization and recovery operation which not only obtains a higher reaction rate than heretofore, but achieves a more uniform product size distribution.

The process in general terms involves feeding liquid vinyl chloride monomer to a reacting mixture maintained at desired polymerization conditions in a reaction zone. An appreciable quantity of polyvinyl chloride is retained or maintained in the reaction mixture, so as to provide a weight ratio, of polymer to monomer, of from about 2:5 to 9:1. In certain highly preferred embodiments, hereinafter defined, narrower ranges thereof are specified. For example when operating at very low temperature as from about 0° to about 40° C. a polymer:monomer ratio of about 3:1 to about 5:1 is almost necessary to obtain practical or realistic reaction rates. The increased reaction rate resulting from the polymer:monomer ratio compensates, at least in part, for the decreased rate of reaction resulting from the low temperature. When operating at a higher temperature, for example, within a range of from about 50° to about 65° C. good results can be obtained by operating at a polymer:monomer ratio of from about 2:5 to about 9:1. To obtain maximum benefits, however, as to the rate of polymerization, the preferred polymer:monomer ratio of about 3:1 to about 5:1 is desirably employed. The reaction mixture of the process thus includes suspended polyvinyl chloride particles, vinyl chloride monomer, and an aqueous phase including water amounting to usually several fold the weight of the polyvinyl chloride and the vinyl chloride monomer present. The aqueous phase also includes water soluble suspension materials which appreciably facilitate and aid the suspension polymerization. Also included is an oil soluble polymerization catalyst, suitably of the peroxide type, such as lauroyl peroxide. A temperature of between about 0° and 70° C. is maintained within the reaction zone.

In the separation or recovery of the polymer produced, a portion of this reaction mixture is withdrawn from the reaction zone, preferably continuously, and the polymer content thereof is removed.

Preferred embodiments of the invention include the separation of the removed portion of the reaction mixture into a predominantly polyvinyl chloride portion and a predominantly aqueous portion, the latter being recycled to the reaction mixture. In particularly preferred embodiments, the separation is a two stage operation and includes an initial stage wherein a partial separation based primarily on the size of polymer particles is achieved.

A vital and key point of the process is that the reaction mixture is maintained with a substantial amount of already polymerized polyvinyl chloride to vinyl chloride monomer present at any time. Generally, the proportions by weight of the polymer present, to the monomer present, are maintained from about 2:5 to about 9:1. As is illustrated in more detail hereinafter, the maintenance of already polymerized polyvinyl chloride in the reaction mixture is discovered to greatly aid and assist the polymerization of the vinyl chloride monomer present, and in fact, can provide a multifold increase in average polymerization rate attainable.

In addition to the feed of fresh vinyl chloride monomer and the recycle of the aqueous portion of the reaction mixture referred to above, make-up quantities of the oil soluble catalysts, emulsifying agent or other suspension material are added to the reaction mixture as required. Certain latitude is permissible in the concentrations of these materials although optimum quantities are usually provided as will be apparent hereinafter.

The details of operation and of the benefits derived therefrom will be evident from the figure and the examples given hereafter. The figure is a schematic representation showing apparatus in process arrangement suitable for a typical embodiment of the process.

Referring to the figure, the principal units of the installation include a reactor 10, an external cooler 20, an initial separator 30 including a screen element 24, a filter 50 and holdup tanks 40, 60. Cooling water, in addition to that supplied to the external cooler 20, is also preferably supplied to the surface area of the reactor 10 by a water jacket (not shown).

In operation, the reactor 10 contains a reaction mixture or slurry including the vinyl chloride monomer and polyvinyl chloride, distributed in an aqueous phase which includes an oil soluble peroxide polymerization catalyst, a water soluble hydrophilic colloid, and preferably a water soluble synthetic emulsifying agent. These materials are kept in suspension by means of a top-mounted, downward deflecting, propeller type agitator 11. Vinyl chloride monomer is added to the reactor 10 through a line 17 in an amount generally equivalent to the polyvinyl chloride removed from the system. The reaction slurry is withdrawn by the action of the pump 23, from the bottom of the reactor 10 through line 12, passed through line 13 through the external cooler 20 and finally through line 14 into the separator 30. The separator suitably includes an internally mounted screen 24 to permit a draining separation. The major liquid portion of the slurry, including the aqueous phase and minor amounts of the unreacted vinyl chloride monomer dispersed therein is passed through the screen 24 into line 16 and sent back to the reactor 10. A small amount of fine polyvinyl chloride particles are also passed through the screen 24, returned to the reactor 10 and ultimately result in larger polymer particles. The larger particles of polyvinyl chloride which do not pass through the screen 24 of the separator 30 are contained in a slurry which is passed through line 15 into a holdup tank or stripper 40. The polymerization reaction is normally conducted at an elevated pressure, generally corresponding to the vapor pressure of the vinyl chloride monomer. Normally, the reactor 10, the external cooler 20 and the screen separator 30 form a closed system at substantially uniform pressure. A line 15 is provided to transfer the thick slurry retained on, or separated from the screen element 24, to the stripper 40. The stripper 40 is usually maintained at atmospheric pressure. A pressure reducing valve 26, or similar device, is provided in the line 15 to provide for the pressure drop between the separator 30 and the stripper 40.

The stripper 40, then, contains a thick slurry of polyvinyl chloride in a predominantly aqueous solution. Some monomer still remaining therein is vented off the stripper 40 through line 18 to a recovery system. The thick slurry of polyvinyl chloride and aqueous solution remaining is then pumped through line 19 to a final separating device 50 which can be a filter, centrifuge or similar apparatus for effecting deliquefying of sludge or slurries. The wet polyvinyl chloride removed from the slurry is then passed through line 25 to a dryer. The aqueous solution therefrom is passed through line 21 into the aqueous phase holdup tank 60. It is then recycled through line 24 to the reactor 10. Makeup water, catalyst, soluble synthetic emulsifying agent or water soluble hydrophilic colloids may be added thereto continuously or in batch through line 22. The oil soluble peroxide polymerization catalyst if preferred may be added directly to the reactor 10.

Equilibrium temperature is maintained within the reactor 10 by the cooled recycled streams returned thereto through line 16 and line 24 and by circulating cooling water through the jacket of the reactor 10.

The following examples are given in illustration but are not intended as limitations on the scope of this invention. All parts and concentrations are by weight except where otherwise specified.

*Example I*

The proportions of polyvinyl chloride employed in this example provide substantially, the maximum rate of polymerization obtainable in conjunction with the other polymerization conditions.

Prior to the process, a charge or reaction mixture must be formed. This is done by initially starting in the same manner as a batch operation. A charge is introduced into the reactor 10 including the following components:

400 parts vinyl chloride monomer
900 parts deionized water
1.2 parts lauroyl peroxide polymerization catalyst
0.48 part sodium dioctyl sulfo succinate
0.22 part methyl cellulose In charging these materials to the reactor, all items except the catalyst and monomer are first added. Then the catalyst, and finally the vinyl chloride monomer are introduced and the reactor sealed. A purge is then effected by the application of a vacuum followed by the application of a small positive gaseous vinyl chloride pressure, followed by venting to purge and exclude oxygen. Nitrogen may be effectively substituted for vinyl chloride.

The reactor is then sealed, agitation with the agitator 11 is then begun and the temperature of the reactor is raised to 56° C. by passing hot water through the jacket of the reactor 10. Pressure is developed within the reactor 10. Since the volume is constant the pressure developed is dependent upon the vapor pressure exerted by the water and vinyl chloride monomer at that temperature. After the polymerization reaction has started and sufficient heat has been produced to maintain this temperature a flow of cooling water is started through the jacket of the reactor 10 to remove the part of the heat generated. Intermittent samples are withdrawn from the reactor 10 to be analyzed by a simple gravimetric analysis to determine the amount of holdup. The sample withdrawn from the reactor 10 readily settles. The solid polyvinyl chloride is easily separated by filtration in a Büchner type funnel. The vinyl chloride monomer is occluded within the polymer. The solid is then weighed, dried in an oven, and reweighed. The loss in weight is substantially due to vinyl chloride monomer and is easily calculated. The second weighing is the weight of the polyvinyl chloride. When the ratio of polyvinyl chloride to vinyl chloride monomer present in the reaction mixture in the reactor 10 is about 4 : 1, as can also be determined by the pressure drop, the mixture is withdrawn, or withdrawal is started as a steady stream, from the bottom of the reactor 10 through line 12, at a rate of about 27 lbs. per hour per cubic foot of reaction mixture volume. The slurry is pumped by pump 23 through line 13 and thence into the external heat exchanger 20, where it is cooled by cooling water (at about 20° C.) to a discharge temperature of about 35° C. in line 14. This cooled slurry then passes to the separator 30 and is dropped on the screen 24 for relatively free draining of the liquid phase from the polyvinyl chloride particles. A large portion, normally about three-fourths, of the aqueous liquid phase passes through the screen 24 and into line 16 for recirculation to the reactor 11. Simultaneously with initiating this withdrawal there is begun the feeding of fresh makeup amounts of vinyl chloride monomer to the reactor 10.

The screen 24 in the separator 30 is tilted to discharge, by relatively free flow, the retained polyvinyl chloride portion, which is passed by gravity flow through the line 15 to the stripper tank 40. A plug valve 26 is provided in line 15 as already mentioned to allow intermittent discharge of this thick slurry to the stripper 40. As already noted, the stripper is maintained at an appreciably lower pressure than the reactor 10.

In the stripper tank 40, a majority of the vinyl chloride monomer content of the liquid aqueous phase accompanying the polymer retained and discharged from the separator 30 is flashed off through line 18 and goes to recovery equipment (not shown) for condensation thereof and reuse of the vinyl chloride monomer. This flashing or venting operation usually will result in a slight further decrease of temperature of the polyvinyl chloride containing mixture to about 28° C.

The polyvinyl chloride slurry is withdrawn from the stripper vessel and passed by pump 27 through line 19 to a filter 50. In many instances, it will be found desirable to maintain an excess of added aqueous solution in the stripper tank 40 for recirculation through line 28, this excess being desirable to facilitate, by dilution fluid flow transfer of the polyvinyl chloride to the filter 50.

In the filter, a second and high degree of separation is obtained of the polyvinyl chloride from the accompanying and adherent aqueous phase, the aqueous phase being discharged from the filter through line 21 to the second holdup tank 60, at which point a convenient addition of make-up quantities of catalyst, and the desired suspension agents (in this instance, sodium dioctyl sulfo succinate and methyl cellulose) can be added.

The predominantly aqueous system in the holdup tank is recirculated by pump 29 through line 24, for manifolding with the recirculated stream from the separator 30, obtained in line 16 and is reintroduced to the reactor vessel 10. The product polyvinyl chloride discharged from the filter contains only several percent of liquid, expressed as water content, and the polyvinyl chloride amounts to 6 pounds per hour per cubic foot of space in the reaction mixture in the reactor 10. Polymer particles of a uniform size of about 300 microns minimum dimension or larger are provided. This corresponds to a variable size of from 50 to 300 microns as produced in the normal batch operation.

The foregoing example illustrates the operation of the process of the invention. It illustrates its application to production of a polymer at a polymerization temperature of 56° C. The production rate, contrasted with a conventional batch operation, is about 2½ times the rate normally attained.

As previously described, the reaction mixture can be maintained with wide variation in the proportions of polyvinyl chloride to vinyl chloride monomer, and, if desired this variable can be appreciably reduced, as in the following example.

*Example II*

Essentially the same procedure as in Example I is followed, with respect to the initial charge and to start up operations. However, after polymerization has started and has progressed to the point at which the ratio of polyvinyl chloride:vinyl chloride monomer is about 2.33 : 1, withdrawal of slurry and feed of fresh vinyl chloride monomer is initiated. Slurry is continuously withdrawn from the bottom of the reactor 10 at a rate of about 28.8 pounds per hour per cubic foot of reactor mixture volume. This produces continuously about 5.5 pounds of substantially dry polyvinyl chloride per hour. This production corresponds to about 2.2 times the production obtained from a normal batch operation. This of course does not take into account the time saved by the avoidance of time consuming features of batch operations such as charging to the reactor, discharging the product mixture, etc. Such a comparison would make the production achieved by the present process even more attractive. Sufficient vinyl chloride monomer to maintain the quantity of monomer present in the reactor constant is added continuously thereto. The vinyl chloride monomer added is of course equal to the amount of vinyl chloride which is polymerized, the amount which is occluded in the polymer and that vented off and sent to the recovery system. The temperature of the reaction mixture is maintained at 56° C. Cooling water at a temperature of 20° C. is passed through the external cooler 20 which cools the slurry to about 35° C. The aqueous solution, vinyl chloride monomer and fine particles of polyvinyl chloride which passes through the screen 24 of the separator 30 is substantially at this same temperature when returned through line 16 to the reactor 10. The thickened slurry, containing the larger polyvinyl chloride particles, is further cooled to a temperature of about 24° C. in the holdup tank 40 by the venting of the unused vinyl chloride monomer through line 18. The aqueous solution thereof is substantially at this same temperature when it is eventually passed from the holdup tank 60 through line 24 back to the reactor 10. Again, polymer particles of relatively uniform size, about 300 microns and slightly larger are obtained.

*Example III*

This example is intended to illustrate a polymerization reaction conducted at a temperature below those usually employed in such reactions. Operation heretofore at temperatures below 40° C. have not been commercially feasible despite the improved polymer properties, that is improved linearity and heat stability.

Essentially the same procedure as in Example I is followed with respect to initial charging and startup operation. Continuous operation is started and maintained at a polyvinyl chloride:vinyl chloride weight ratio of about 4 : 1. However, instead of the relatively elevated temperature of Example I, the operating temperature is reduced to about 35° C. and maintained at this temperature by the passage of 30° C. cooling water through the jacket of the reactor 10 and external cooler 20. Slurry is withdrawn from the reactor at a rate of, approximately, 30 to 40 percent of the rate accomplished at 55–56° C. Polymer particles of substantially uniform size of about 300 microns minimum dimension are obtained. The product benefits of low temperature operation are achieved.

*Example IV*

This example illustrates a polymerization reaction conducted at an even lower temperature than that of the foregoing example.

Essentially the same procedure as in Example III is followed with respect to initial charging and start up operation. When the ratio of polyvinyl chloride to vinyl chloride monomer has built up to about 4:1 withdrawal of slurry and feed of fresh vinyl chloride monomer is initiated. The temperature of the reacting mixture at this time is reduced to about 10° C. and maintained at this temperature by the passage of refrigerated water or brine at about 5° to 8° C., through the external cooler 20 and through the jacket of the reactor 10. Slurry is continuously withdrawn from the bottom of the reactor 10 at a rate of about 25 to 33 percent of the production rate achieved in Example I. Polymer particles of a substantially uniform size of about 300 microns minimum dimension are obtained. Again, the properties of product attainable heretofore only by very slow batch operations will be provided.

Although continuous operations, as per the above example, are most preferred, in some instances the major benefits of the process are achieved by a slightly different technique. According to this alternative embodiment, a "heel" of reaction mixture is left in the reaction vessel after one run, this "heel" being a mixture of polyvinyl chloride, aqueous solution and some vinyl chloride monomer. Then the polymerization is reinitiated and additions of monomer, and water, and catalyst and suspension agents added over a period of time. The total quantity of reaction mixture is thus increased, but the desired operating ratio of polymer:monomer is preserved. When the reaction mixture approaches the maximum charge suitable for the vessel, feed is stopped, and a major portion of the mixture is withdrawn for polymer recovery and also recovery of the monomer therein. However, a substantial "heel" of the mixture is left in to facilitate the following cycle.

From the foregoing examples, it will be clear that the technique of the present invention provides appreciably improved production. It is also apparent that the process of this invention has improved reaction rates to such an extent that it is now feasible to operate at temperatures of 40° C. and below. Hence, it is possible now to choose operating temperatures over a wide range, this depending largely upon the type of product desired. Polymer having good resin properties may be obtained by operating at a concentration of polyvinyl chloride:vinyl chloride monomer ratio so as to obtain a substantially improved poduction rate over that obtainable with batch techniques at equal temperatures.

As previously stated, the essential factor present in all embodiments of the invention is the maintenance, or hold up, of an appreciable quantity of polymerized material while polymerizing copresent monomeric vinyl chloride. As will be clear from the foregoing examples, reaction rate increases of the order of 2½ times the average batch reaction rates are obtained. The extent of the increase depends to a great deal on the weight ratio of polyvinyl chloride to vinyl chloride, and, as already described, maximum rates are achieved when maintaining a ratio of 4:1. However, it is not essential that extremely close control be maintained, and the indicated high rates are provided within the particularly preferred range of from 3 to 5 parts of polyvinyl chloride to 1 of monomer. Suitable temperatures range from as low as 0 to about 70° C. Preferable ranges of temperature include two narrow ranges of temperature within the said wider range. Highly preferred ranges of temperature are from about 5° C. to about 40° C. and from about 50° C. to about 65° C. When the principal objective of an operation is to provide economical production, the higher temperature range is used. On the other hand, when product attributes associated with low temperature polymer formation is required, the indicated preferred low temperature range is applied.

Other steps in the process may also be varied. For example, a two-stage separation may be considered unnecessary for certain purposes. In this case, the screen separator may be entirely eliminated and the slurry from the bottom of the reactor 10 may be sent to a single separator where the solid polyvinyl chloride may be removed from the liquid solution. This may be conveniently done by any number of liquid-solid separating devices such as filtration or centrifuging. The liquid portion may be then returned to the reactor or discarded.

A screening separation step (in the two-stage type of embodiment) is not essential. Other separating steps may be conveniently substituted. For example, a settling tank may be used. A preferred type is a horizontal type settling tank which will provide a rapid rate of settling. The larger polvinyl chloride particles will rapidly settle to the bottom of the tank and from there be withdrawn in the form of a slurry and further processed. The upper layer will contain the smaller particles of polyvinyl chloride. This upper layer will be drawn off and recycled to the reactor.

The reactor 10 is preferably a glass lined or stainless steel kettle designed for operation up to pressures of about 150 p.s.i.g. Other inactive materials of construction may be used however. The design is not highly critical from the standpoint of product properties provided high standards of cleanliness and purity are maintained.

The design of adequate facilities for centrifuging and drying is not critical from the standpoint of product properties provided high standards of cleanliness and purity are maintained.

The water employed as the polymerization medium should be distilled or deionized, desirably with a minimum specific resistivity of 140,000 ohms at 18° C. In preparing a charge, the proportions of water should be at least 150 parts of water per 100 parts of vinyl chloride monomer initially introduced, and this proportion is preserved, during operation, to the vinyl chloride monomer plus polymer present. Generally it is preferred to provide water in the proportions of from about 150 to 400 percent based upon the sum of the vinyl chloride monomer and polymer maintained in the reaction zone. Substantially larger amounts of water can be employed but such an excess generally serves no useful purpose, unless used to to reduce coagulation problems which sometimes occur. The proportions of emulsifying agent and hydrophilic colloid employed or similarly functioning suspending agents, are effected by the ratio of water in the charge. The proportions of these components as mentioned above can be altered proportionately with the quantity of water used. For example, slightly larger amounts of water are used when a hydrophilic colloid is not used in the process.

The degree of agitation provided during the polymerization operation is important but not critical. Generally, the reacting or polymerizing mixtures should be agitated such that a Pfaudler agitative intensity factor (see Pfaudler Company, Rochester, New York, Reprint No. 508 by O. W. Green), of about 4 generally is attained, although a suitable range is from about 2 to 6. Above this frequency solid polyvinyl chloride is thrown out of the reaction mass and to the top of the mixture. Excessive foaming also occurs. Below this frequency coagulation problems are encountered.

The concentration of the peroxide catalyst, or other oil soluble catalyst, is not highly critical but does affect the rate of polymerization. It is usually desirable to employ from about 0.1 percent to 3 percent thereof based on the quantity of the vinyl chloride monomer present. Below 0.1 percent the reactor rate becomes too slow and above 3 percent the polymer produced is subject to burning when milled. As already indicated an oil soluble organic peroxide is highly preferred. A preferable catalyst of this type is lauroyl peroxide. Illustrative of catalysts of this character which may be used are acetyl peroxide, dicaprylyl peroxide, stearoyl peroxide, acetyl benzoyl peroxide, diisopropyl benzene hydroperoxide and p-menthane hydroperoxide. Mixtures of peroxides may be used if desired.

The polymerization generally, is desirably carried out with an effective quantity of a water soluble hydrophilic colloid, in conjunction with emulsifying agent as a process stabilizing and anticoagulation composition. Although methyl cellulose is a preferred component numerous other components may be used successfully. Illustrative of these are ethyl cellulose, polyvinyl alcohol, copolymerization products of vinyl acetate and maleic anhydride or maleic acid, hydroxy ethyl cellulose (glycol), carboxy methyl cellulose, gelatin, agar-agar and starch. In the case of methyl cellulose, preferred proportions are from about 0.03 to 0.15 part per 100 parts by weight of water. Though this is the preferable range it is possible to use from 0.01 to 0.5 part per 100 parts of water. Below 0.01 concentration thereof coagulation is likely to occur in the reactor 10, external cooler 20 or the lines. Above a 0.5 concentration thereof there will result undesirable product properties. For example, the particle size of the granular polyvinyl chloride produced may be too small or poor dry blending qualities will result.

Considerable latitude is also permissible with respect to the concentration of the emulsifying agent. The salts of sulfo alkyl succinates are a preferred class of emulsifying surface active materials. Other emulsifying agents which may be successfully used in the process are sorbitan monolaurate, a polyethylene glycol of sorbitan monolaurate, monopalmitate, monooleate, acetyl dimethyl benzoyl ammonium chloride and alkaryl sulfo succinates. Various condensation products of ethylene glycol and fatty alcohols such as ethylene oxide condensate of saturated fatty acid monoesters of pentaerythritol can be substituted for the sodium dioctyl sulfo alkyl succinates in the examples given. The proportions of the emulsifying agents to be added is up to 0.5 part per 100 parts of water. When the water proportions are in excess of three times the weight of total vinyl chloride (monomer plus polymer), no emulsifying agent is essential. At the preferred ratio of 2.25:1 a preferred range of emulsifier is from about .01 to 0.3 part per 100 parts of water. The preferred range for sodium dioctyl sulfo succinate, a preferred emulsifying agent, is from about 0.02 to about 0.2 part per 100 parts of water.

The vinyl chloride monomer employed in the present process should be polymerization grade with, preferably, the following specifications:

Acetylene content—less than 5 p.p.m.
Acetaldehyde content—less than 15 p.p.m.
Iron content—less than 0.5 p.p.m.
Polymerization rate test greater than 80 percent conversion in 5 hours.

It is evident that during the course of the operation considerable amounts of catalyst, emulsifying agent, hydrophilic colloid and water will be removed from the process along with the polyvinyl chloride production. Consequently the above components of the reaction system must be replaced in order to maintain effective concentrations. These components can be added in make-up quantities continuously or in batch.

It will be clear from the foregoing that the alternative components of the reaction mixture can also be used when expedient, without departing from the scope of the invention. In order to illustrate the flexibility of the process employed above the following examples are given:

*Example V*

Essentially the same procedure is employed as in Example I except that a charge or recipe of the following composition and proportions is initially introduced into the reactor for providing the mixture for continuous operation:

300 parts of vinyl chloride monomer
800 parts deionized water
2.0 percent dicaprylyl peroxide catalyst
0.2 part sorbitan monolaurate
0.2 part ethyl cellulose Continuous operation is started and the reacting mixture is maintained at a polyvinyl chloride:vinyl chloride monomer weight ratio of about 4.1. Operating temperature is maintained at 56° C. by the passage of cooling water through the jacket of the reactor 10 and external cooler 20. Slurry is withdrawn from the reactor at a rate of approximately 30.5 pounds per cubic foot of reactor mixture volume per hour. Approximately 4.5 pounds of dry polyvinyl chloride per cubic foot of reactor mixture volume is produced. The polymer properties are substantially the same as in Example I.

*Example VI*

Essentially the same procedure is employed as in Example V except that a charge or recipe of the following composition and proportions is introduced into the reactor 10:

500 parts vinyl chloride monomer
800 parts deionized water
0.8 percent acetyl peroxide catalyst
0.3 part monopalmitate
0.3 part polyvinyl alcohol Continuous operation is started and the reaction mixture is maintained at a polyvinyl chloride:vinyl chloride monomer weight ratio of about 4:1. Operating temperature is maintained at 56° C. by the passage of cooling water through the jacket of the reactor 10 and the external cooler 20. Slurry is withdrawn from the reactor at a rate of approximately 27 pounds per cubic foot of reactor mixture volume per hour. Approximately 7.5 pounds of dry polyvinyl chloride per cubic foot of reactor mixture volume is produced. The polymer properties are substantially the same as in Example I.

*Example VII*

As stated heretofore, when operating under conditions wherein the water exceeds threefold by weight the sum of the polymer and the monomer the emulsifying agent may be eliminated from the recipe. The emulsifying agent is therefore eliminated in this example.

Essentially the same procedure is employed in this example as is employed in the above examples except that a charge or recipe of the following composition and proportions is introduced into the reactor 10:

300 parts vinyl chloride monomer
900 parts deionized water
2.5 percent stearoyl peroxide
0.5 part hydroxy ethyl cellulose (glycol)

Continuous operation is started and the reaction mixture maintained at a polyvinyl chloride:vinyl chloride monomer weight ratio of about 4:1. Operating temperature is maintained at 56° C. by the passage of cooling water through the jacket of the reactor 10 and external cooler 20. Slurry is withdrawn from the reactor 10 at a rate of approximately 25 pounds per cubic foot of reactor mixture volume per hour. Approximately 4.5 pounds of dry polyvinyl chloride per cubic foot of reactor mixture volume is produced. The polymer properties are substantially the same as in Example I.

From the foregoing examples and description it is seen that the process of the present invention provides greatly improved production as well as easy control to achieve continuous operation if desired. The process having numerous other forms in addition to the specific examples, it is limited only by the following claims.

We claim:
1. An aqueous suspension process for the polymerization of vinyl chloride into granular polyvinyl chloride comprising continuously feeding vinyl chloride monomer into a reaction zone wherein is maintained throughout the polymerization a polymerization mixture including (a) vinyl chloride monomer and polyvinyl chloride in the weight proportions of polymer:monomer of from about 3:1 to about 5:1, (b) from about 0.1 to 3 percent of an oil-soluble polymerization catalyst, (c) at least about 150 parts of water per 100 parts of the polyvinyl chloride plus the vinyl chloride monomer, and (d) at least one water-soluble suspension agent; maintaining the polymerization mixture at a temperature of from about 0° C. to about 70° C.; continuously withdrawing from said reaction zone a portion of the polymerization mixture; separating said portion into two portions, a first portion composed primarily of polyvinyl chloride polymer particles associated with minor amounts of the aqueous polymerization solution and a second portion composed primarily of aqueous polymerization solution associated with minor amounts of unreacted vinyl chloride monomer; and recycling at least part of the said second portion to the reaction zone.

2. An aqueous suspension process for the polymerization of vinyl chloride into granular polyvinyl chloride comprising continuously feeding vinyl chloride monomer into a reaction zone wherein is maintained throughout the polymerization a polymerization mixture including (a) vinyl chloride monomer and polyvinyl chloride in the weight proportions of polymer:monomer of from about 3:1 to about 5:1, (b) from about 0.1 to 3 percent of an oil-soluble polymerization catalyst, (c) at least about 150 parts to 400 parts of water per 100 parts of the polyvinyl chloride plus the vinyl chloride monomer, and (d) at least one water-soluble suspension agent; maintaining the polymerization mixture at a temperature of from about 0° C. to about 70° C.; continuously withdrawing from said reaction zone a portion of the polymerization mixture and subjecting it to a two-stage separation, the first stage consisting in dividing the said polymerization mixture into two portions, a first portion comprising a predominantly aqueous liquid, having minor amounts of vinyl chloride monomer and finely divided polyvinyl chloride suspended therein, and a second portion comprising a slurry of larger polyvinyl chloride particles and minor amounts of vinyl chloride monomer and aqueous solution, recycling at least part of the said first portion to the reaction zone, and separating the larger polyvinyl chloride particles from said second portion, and recycling at least part of the remaining liquid portion to the reaction zone.

3. In an aqueous suspension process for the continuous polymerization of vinyl chloride into granular polyvinyl chloride in a reaction zone wherein is maintained throughout polymerization a polymerization mixture including (a) from about 0.1 to 3 percent of an oil-soluble polymerization catalyst, (b) from about 150 to 400 parts of water per 100 parts of polyvinyl chloride plus vinyl chloride monomer, and (c) at least one water soluble suspension agent, and wherein the polymerization mixture is maintained at a temperature of from about 0° to about 70° C., the improvement comprising removing vinyl chloride polymer from the polymerization mixture only in part, while maintaining within the reaction zone throughout the polymerization a residual amount of polyvinyl chloride polymer such that there are from about 3 to about 5 parts thereof per each part by weight of the vinyl chloride monomer present in the zone.

4. The process of claim 2 further defined in that the polymerization system is maintained at above about 0° to about 40° C.

5. The process of claim 2 further defined in that the polymerization system is maintained at about 50° to about 65° C.

References Cited in the file of this patent
UNITED STATES PATENTS

| | | |
|---|---|---|
| 2,475,016 | De Nie | July 5, 1949 |
| 2,528,469 | Condo et al. | Oct. 31, 1950 |
| 2,537,334 | De Nie | Jan. 9, 1951 |
| 2,663,701 | Ronay | Dec. 23, 1953 |
| 2,694,700 | Shanta | Nov. 16, 1954 |